W. CORNWALL, Sr., W. CORNWALL, Jr., & A. W. CORNWALL.
Machine for Mixing Materials for Making Soap.
No. 228,319.  Patented June 1, 1880.
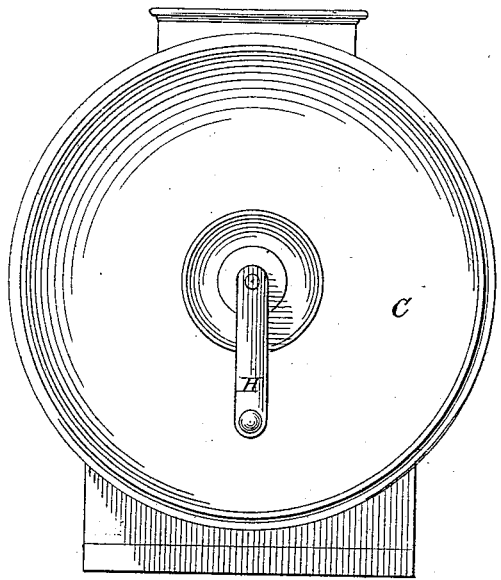
Fig. 3.
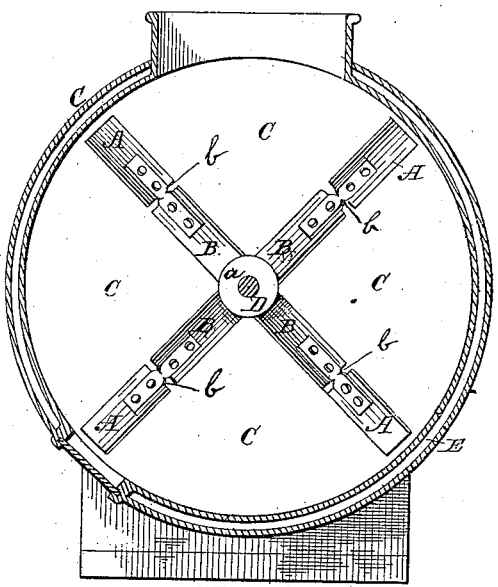
Fig. 2.
Fig. 1.
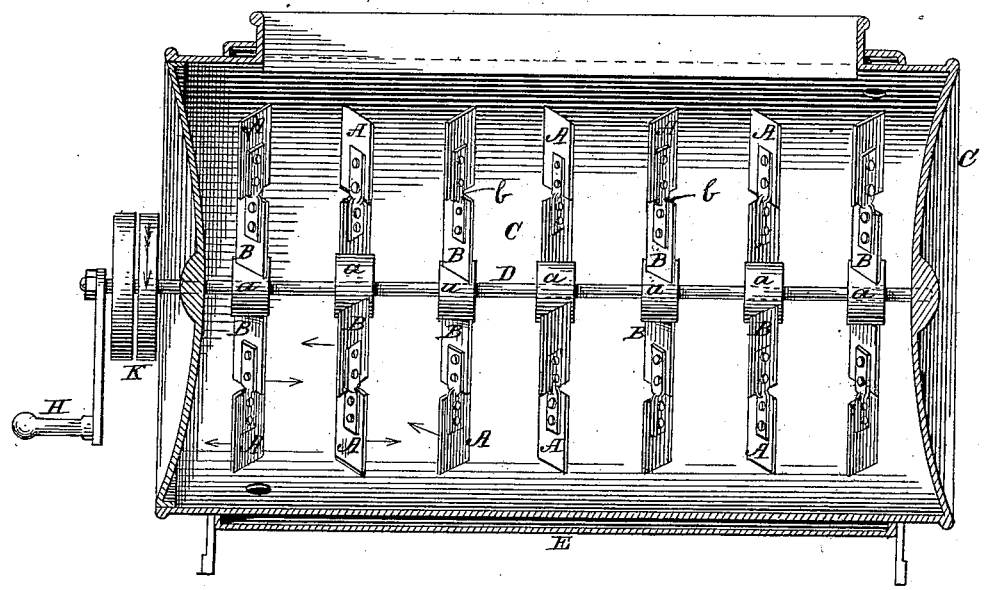
Attest:
R. F. Barnes
C. Clarence Poole
Inventors:
Wm Cornwall Sr
Wm Cornwall Jr
A. W. Cornwall

UNITED STATES PATENT OFFICE.

WILLIAM CORNWALL, SR., WILLIAM CORNWALL, JR., AND AARON W. CORNWALL, OF LOUISVILLE, KENTUCKY.

MACHINE FOR MIXING MATERIALS FOR MAKING SOAP.

SPECIFICATION forming part of Letters Patent No. 228,319, dated June 1, 1880.

Application filed August 23, 1879.

*To all whom it may concern:*

Be it known that we, WILLIAM CORNWALL, Sr., WILLIAM CORNWALL, Jr., and AARON W. CORNWALL, of the city of Louisville, county of Jefferson, and State of Kentucky, have invented an Improved Machine for Mixing Fats and Alkalies for Making Soap, of which the following is a specification.

Our invention relates to an improvement in machines for mixing fats and alkalies for making soap, and also for mixing various other substances which are plastic or liquid.

Our improvement consists in the construction and arrangement of the rotating arms of the mixer proper. Said arms are each made of two flat blades or paddles, which are set at an angle to each other, and connected so as to extend radially from the rotating shaft. The corresponding paddles of adjacent or neighboring arms are also set at opposite inclinations to the plane of rotation.

In accompanying drawings, Figure 1 is a vertical longitudinal section of our improved mixer. Fig. 2 is a vertical cross-section, and Fig. 3 an end view of the same.

The mixing arms or stirrers A B are attached to hubs *a* fast on shaft D, which is rotated by a crank, H, or by a belt (not shown) running on pulley K. The mixer proper, composed of said arms A B and shaft D, rotates in a cylindrical vessel, C, having a jacket, E, which adapts it for application of steam for heating the materials being mixed.

Each stirrer or mixing-arm consists of two parts or flat plates or paddles, A B, which are set at an angle to each other, and connected by joint-irons *b*. In this instance said paddles are shown placed at a right angle to each other; but the angle may vary somewhat. The inner paddles, B, are radial to shaft D, but set inclined at an angle of about forty-five degrees to the latter. The outer paddles, A, being set at right angles to paddles B, necessarily have the same inclination of forty-five degrees to the axis and plane of rotation, but in the opposite direction.

Not only are the members A B of each arm set at opposite inclinations, but the corresponding paddles A A or B B of adjacent arms are set inclined in opposite directions. The result of this arrangement is that the paddles A, which are nearest the periphery of the vessel C, set currents of the plastic or liquid substance in opposite directions to the currents caused by paddles B; and, furthermore, each paddle of the inner series, B, and outer series, A, produces a movement or current of the mass in a direction opposite that caused by its neighbor in the same series. Hence there are not only currents in the outer portion of the plastic mass or near the periphery of vessel C and currents in the inner portion of the mass around and near the shaft D, but there are also counter-currents in both the outer and inner portions of the mass. These moving portions of the mass whirl by each other and come in contact and intermingle, and portions are also projected to the periphery of vessel C and rebound toward the center, so that the materials are quickly mixed and reduced to homogeneity.

We do not claim, broadly, a mixer having a rotating arm a portion of which is set at an inclination to the plane of rotation; but What we do claim is—

1. In a machine for mixing plastic or liquid substances, the combination, with a rotatory shaft, of mixing-arms composed of two connected paddles, A B, which are aligned or arranged radially to said shaft, and arranged at right angles to each other, and the inner one, B, placed at an inclination to the shaft, as shown and described.

2. In a mixing-machine, the combination, with the rotating shaft D, of mixing-arms, each composed of paddles A B, set at right angles to each other and inclined to the shaft, the inner paddles, B B, of contiguous arms being placed at opposite inclinations to each other, as shown and described.

WM. CORNWALL, SR.
WM. CORNWALL, JR.
A. W. CORNWALL.

Witnesses:
A. Y. JOHNSON, Jr.,
JOHN SULLIVAN.